United States Patent
Beech

(10) Patent No.: US 12,338,596 B2
(45) Date of Patent: Jun. 24, 2025

(54) SEAWALL CONSTRUCTION USING CONCRETE FORMS

(71) Applicant: Beech Contractors, LLC, Charleston, SC (US)

(72) Inventor: Joshua Earl Beech, Johns Island, SC (US)

(73) Assignee: Beech Contractors, LLC, Charleston, SC (US)

( * ) Notice: Subject to any disclaimer, the term of this patent is extended or adjusted under 35 U.S.C. 154(b) by 319 days.

(21) Appl. No.: 18/073,390

(22) Filed: Dec. 1, 2022

(65) Prior Publication Data
US 2023/0101664 A1 Mar. 30, 2023

Related U.S. Application Data

(63) Continuation of application No. 16/991,781, filed on Aug. 12, 2020, now Pat. No. 11,530,521.

(51) Int. Cl.
*E02D 29/02* (2006.01)

(52) U.S. Cl.
CPC .. *E02D 29/0275* (2013.01); *E02D 2250/0007* (2013.01); *E02D 2250/0023* (2013.01); *E02D 2300/0006* (2013.01); *E02D 2300/0009* (2013.01); *E02D 2300/002* (2013.01); *E02D 2300/0026* (2013.01); *E02D 2300/0075* (2013.01)

(58) Field of Classification Search
CPC ........ E02D 29/0275; E02D 2250/0007; E02D 2250/0023
See application file for complete search history.

(56) References Cited

U.S. PATENT DOCUMENTS

| | | | | |
|---|---|---|---|---|
| 1,101,592 | A | * 6/1914 | Wagner | E04G 9/02 249/43 |
| 1,907,135 | A | * 5/1933 | Wemlinger et al. | E02B 3/066 405/285 |
| 2,432,002 | A | 12/1947 | Frederick, Jr. et al. | |

(Continued)

OTHER PUBLICATIONS

Seawall and Submerged Forming. Webpage [online]. Form Cast Concrete Forming Systems, 2020 [retrieved on Jul. 28, 2020]. Retrieved from the Internet: <URL: http://www.formcastconcrete.net/seawall.php>. (1 page).

(Continued)

*Primary Examiner* — Tara Mayo
(74) *Attorney, Agent, or Firm* — Klarquist Sparkman, LLP

(57) ABSTRACT

A method for constructing a seawall section includes coupling an end of a substantially-waterproof barrier member to a footing. A concrete form is mounted to the footing such that a top end of the form is higher than an exposed upper surface of the footing. The concrete form defines at least part of a fill volume. Another end of the barrier member is coupled to the concrete form such that the barrier member extends over a side of the concrete form opposite the fill volume. Concrete is then poured into the fill volume and cured to form the seawall section. Prior to the curing, a body of water at the footing may be higher than the upper surface of the footing. However, the barrier member prevents water from entering the fill volume through the concrete form.

15 Claims, 19 Drawing Sheets

(56) References Cited

U.S. PATENT DOCUMENTS

| | | | | |
|---|---|---|---|---|
| 3,245,648 | A | * | 4/1966 | Johansson et al. ..... E04G 11/22 |
| | | | | 425/DIG. 53 |
| 4,426,061 | A | * | 1/1984 | Taggart ............... E04G 17/0658 |
| | | | | 52/410 |
| 4,798,364 | A | | 1/1989 | Scott |
| 5,316,848 | A | | 5/1994 | Bartlett et al. |
| 6,575,667 | B1 | | 6/2003 | Burt et al. |
| 7,628,570 | B2 | | 12/2009 | Davidsaver et al. |
| 8,033,759 | B2 | | 10/2011 | Davidsaver et al. |
| 2004/0013901 | A1 | | 1/2004 | Irvine et al. |
| 2006/0067805 | A1 | * | 3/2006 | Reed ....................... F16B 15/02 |
| | | | | 411/451.2 |
| 2013/0074433 | A1 | | 3/2013 | Ciuperca |

OTHER PUBLICATIONS

Truline Hybrid Sheet Piling System. Brochure [online]. Truline LLC, 2019 [retrieved on Jul. 28, 2020]. Retrieved from the Internet: <URL: https://truline.us/wp-content/uploads/2019/06/Truline-Seawalls-Brochure.pdf>. (2 pages).

* cited by examiner

SEAWALL CONSTRUCTION USING CONCRETE FORMS

CROSS REFERENCE TO RELATED APPLICATION

This application is a continuation of U.S. patent application Ser. No. 16/991,781, filed Aug. 12, 2020, which is incorporated by reference herein.

FIELD

The present disclosure relates generally to seawalls, and more particularly, to assemblies and methods for constructing a seawall or section thereof using concrete forms.

BACKGROUND

A battery wall is a defensive man-made seawall that separates a landmass from a tidal body of water (e.g., ocean, sea, lake, bay, harbor, river, estuary, etc.). The battery wall protects the landmass from flooding, damage, and/or erosion, for example, due to the normal impact of tides and waves and/or occasional storm-related surges. For example, portions of the Charleston peninsula in South Carolina are protected by a "high" battery seawall (built in the 1800s) and a "low" battery seawall (built in the early 1900s) from tidal waters in the Ashley and Cooper Rivers, which converge at the end of the peninsula to form Charleston harbor. The constant exposure of the seawall to the destructive forces of the water as well as other environment factors require the seawall to be periodically repaired or replaced over time. In conventional construction methods to repair or replace a section of an existing seawalls, a temporary cofferdam is formed within the tidal body to shield the construction site from contact with the water. However, the building of a cofferdam adds substantial time and cost to the repair/replacement process.

Embodiments of the disclosed subject matter may address one or more of the above-noted problems and disadvantages, among other things.

SUMMARY

Embodiments of the disclosed subject matter provide assemblies and methods for constructing a seawall or section thereof using concrete forms. The concrete form defines a fill volume into which fluid concrete is poured. The concrete form holds the fluid concrete in place until it can harden, after which the concrete form can be removed, leaving behind the hardened concrete as the new section of the seawall. However, water from an adjacent body of water that contacts the concrete form may penetrate through the form and infiltrate the fill volume, thereby compromising the construction site and/or the integrity of the final concrete structure. In embodiments, one or more substantially-waterproof barrier members are provided to prevent water from entering the fill volume through the concrete form. For example, the barrier member(s) can be disposed over a surface of the concrete form that faces the body of water. In some embodiments, after the concrete has hardened to form the new seawall section, the concrete form and barrier member(s) can be retrieved and used in the construction of another seawall section.

In a representative embodiment, a method for constructing a section of a seawall adjacent to a body of water is provided. The method can comprise (a) coupling a first end of a barrier member to a footing. The barrier member can be substantially waterproof. The method can further comprise (b) mounting a concrete form to the footing such that a top end of the concrete form is disposed higher than an exposed upper surface of the footing. The mounted concrete form can define at least part of a fill volume over the upper surface of the footing. The method can also comprise (c) coupling a second end of the barrier member to the concrete form such that the barrier member extends over a side of the concrete form opposite to the fill volume. The method can further comprise (d) after (c), pouring concrete into the fill volume, and (e) curing the poured concrete to form the battery wall section. After (c) and before (e), the body of water at the footing can be higher than the upper surface of the footing, and the barrier member can prevent water from the body from entering the fill volume through the concrete form.

In some embodiments, during (b) and (c), the body of water at the footing can be lower than the upper surface of the footing.

In some embodiments, during (a)-(e), the body of water can be in contact with the footing.

In some embodiments, the barrier member can be a flexible polymer sheet or cloth, for example, a polyethylene sheet having a thickness of at least 15 mil (0.015").

In some embodiments, the concrete form can comprise a panel attached to a metal frame, the panel can face toward the fill volume, and the metal frame can be on an opposite side of the panel from the fill volume.

In some embodiments, (a) of the method can comprise coupling a ledger to a side surface of the footing that faces the body of water. The first end of the barrier member can be retained between a first surface of the ledger and the side surface of the footing. The ledger can have a second surface opposite the first surface, and the second surface can face toward the body of water.

In some embodiments, in (c) of the method, the barrier member can wrap around a bottom surface of the ledger and can extend over the second surface of the ledger and the side of the concrete form.

In some embodiments, in (c) of the method, the barrier member can wrap around a top surface of the ledger and can extend over the side of the concrete form. The second surface of the ledger can be exposed to the body of water.

In some embodiments, (c) of the method can comprise using one or more mechanical clamps to secure the second end of the barrier member to the top end of the concrete form.

In some embodiments, (b) of the method can comprise disposing a bottom end of the concrete form on or over a top surface of a ledger coupled to a side surface of the footing that faces the body of water.

In some embodiments, (b) of the method can further comprise attaching one end of a first support member to the upper surface of the footing and an opposite end of the first support member to the concrete form, and attaching one end of a second support member to the upper surface of the footing and an opposite end of the second support member to the concrete form. The first support member can be at a first angle with respect to the upper surface of the footing, and the second support member can be at a second angle with respect to the upper surface of the footing.

In some embodiments, each of the first and second angles can be 45°.

In some embodiments, a height of the attachment of the first support member to the concrete form with respect to the upper surface of the footing can be greater than a height of the attachment of the second support member to the concrete form with respect to the upper surface of the footing.

In some embodiments, the attachment of the second support member to the concrete form can be midway, or substantially midway, between the attachment of the first support member to the concrete form and the upper surface of the footing along a vertical direction.

In some embodiments, a height of the attachment of the first support member can substantially correspond to a height at which the body of water contacts the barrier member at high tide.

In some embodiments, the method can further comprise removing an upper portion of an existing seawall while leaving in place a lower portion of the existing seawall. The lower portion can form the footing.

In some embodiments, the method can further comprise forming the footing by forming an open trench in ground adjacent to or underneath the body of water, pouring concrete into the open trench, and curing the poured concrete within the trench to form the footing.

In some embodiments, the method can further comprise, after (e): decoupling the barrier member from the concrete form and the footing; dismounting the concrete form from the footing; and reusing the concrete form, the barrier member, or both to form another section of the seawall.

In another representative embodiment, an assembly for constructing a section of a seawall adjacent to a body of water is provided. The assembly can comprise a concrete form and a barrier member. The concrete form can be mounted to a footing and can comprise a panel attached to a metal frame. A top end of the concrete form can be higher than an exposed upper surface of the footing, and the panel can define at least part of a fill volume over the upper surface of the footing. The barrier member can have a first end coupled to the footing and a second end coupled to the concrete form. The barrier member can extend over a side of the concrete form opposite to the fill volume. The barrier member can be substantially waterproof and can be arranged to prevent water from the body from entering the fill volume through the concrete form.

In some embodiments, the barrier member can be a flexible polymer sheet or cloth, for example, a polyethylene sheet having a thickness of at least 15 mil (0.015").

In some embodiments, the assembly can further comprise a ledger coupled to a side surface of the footing that faces the body of water. The first end of the barrier member can be retained between a first surface of the ledger and the side surface of the footing. The ledger can have a second surface opposite the first surface, and the second surface can face toward the body of water.

In some embodiments, the barrier member can wrap around a bottom surface of the ledger and can extend over the second surface of the ledger and the side of the concrete form.

In some embodiments, the barrier member can wrap around a top surface of the ledger and can extend over the side of the concrete form such that the second surface of the ledger is not covered by the barrier member.

In some embodiments, the assembly can further comprise a first support member and a second support member. The first support member can have one end attached to the upper surface of the footing and an opposite end attached to the concrete form. The second support member can have one end attached to the upper surface of the footing and an opposite end attached to the concrete form. The first support member can be at a first angle with respect to the upper surface of the footing, and the second support member can be at a second angle with respect to the upper surface of the footing.

In some embodiments, each of the first and second angles can be 45°.

In some embodiments, a height of the attachment of the first support member to the concrete form with respect to the upper surface of the footing can be greater than a height of the attachment of the second support member to the concrete form with respect to the upper surface of the footing.

In some embodiments, the attachment of the second support member to the concrete form can be midway, or substantially midway, between the attachment of the first support member to the concrete form and the upper surface of the footing along a vertical direction.

This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

Disclosed herein are assemblies and methods for constructing a seawall, or section thereof. As used herein, seawall refers to a man-made coastal defense structure that protects an adjacent landmass from erosion or other damage from an adjacent tidal body of water. Such seawalls may also be referred to as battery walls, bulkheads or bulkheading, or retaining walls. In some embodiments, one or more concrete forms are used to form a seawall section atop an existing footing (e.g., a concrete base or other fixed structure). The concrete form(s) define, at least in part, a fill volume into which fluid concrete is poured. In some embodiments, existing or previously-formed sections of the seawall are provided adjacent to the concrete form(s) and can further define the fill volume. The concrete form(s) hold the poured concrete in place atop the existing footing until it can harden. Once hardened, the concrete form(s) can be removed, leaving behind the hardened concrete as the new seawall section atop the footing.

In embodiments, one or more substantially-waterproof barrier members(s) can be provided. For example, each barrier member can be a flexible polymer sheet or cloth and can be disposed over a surface of a concrete form that faces the body of water. In some embodiments, the barrier member has one end coupled to the footing and an opposite end coupled to the concrete form. The barrier member is thus retained in place over a vulnerable surface of the concrete form to prevent water from the tidal body from entering the fill volume through the respective concrete form, or at least reduce an amount of water that is able to enter the fill volume. The construction site can thus remain exposed to the tidal body of water, e.g., without a cofferdam shielding the construction site from the body of water, which can substantially reduce the amount of time and costs associated with construction of the seawall.

In some embodiments, a height of the tidal body varies between a low-tide height where the water only contacts the footing and a high-tide height where the water comes into contact with the barrier member(s). The body of water can thus exert forces (e.g., due to waves or other motion) on the concrete form through the corresponding barrier member. Thus, the concrete form can be reinforced by one or more support members to enable the concrete form to withstand such forces prior to hardening of the poured concrete within the fill volume. For example, one or more support members may extend from a surface of the concrete form that faces the fill volume to an upper surface of the footing at a bottom of the fill volume. In some embodiments, the concrete form, which is supported by the one or more support members and protected by the one or more barrier members, can be installed for an extended period of time prior to pouring of the concrete and hardening thereof, for example, at least a few hours beforehand and as much as several days.

Figure 1:
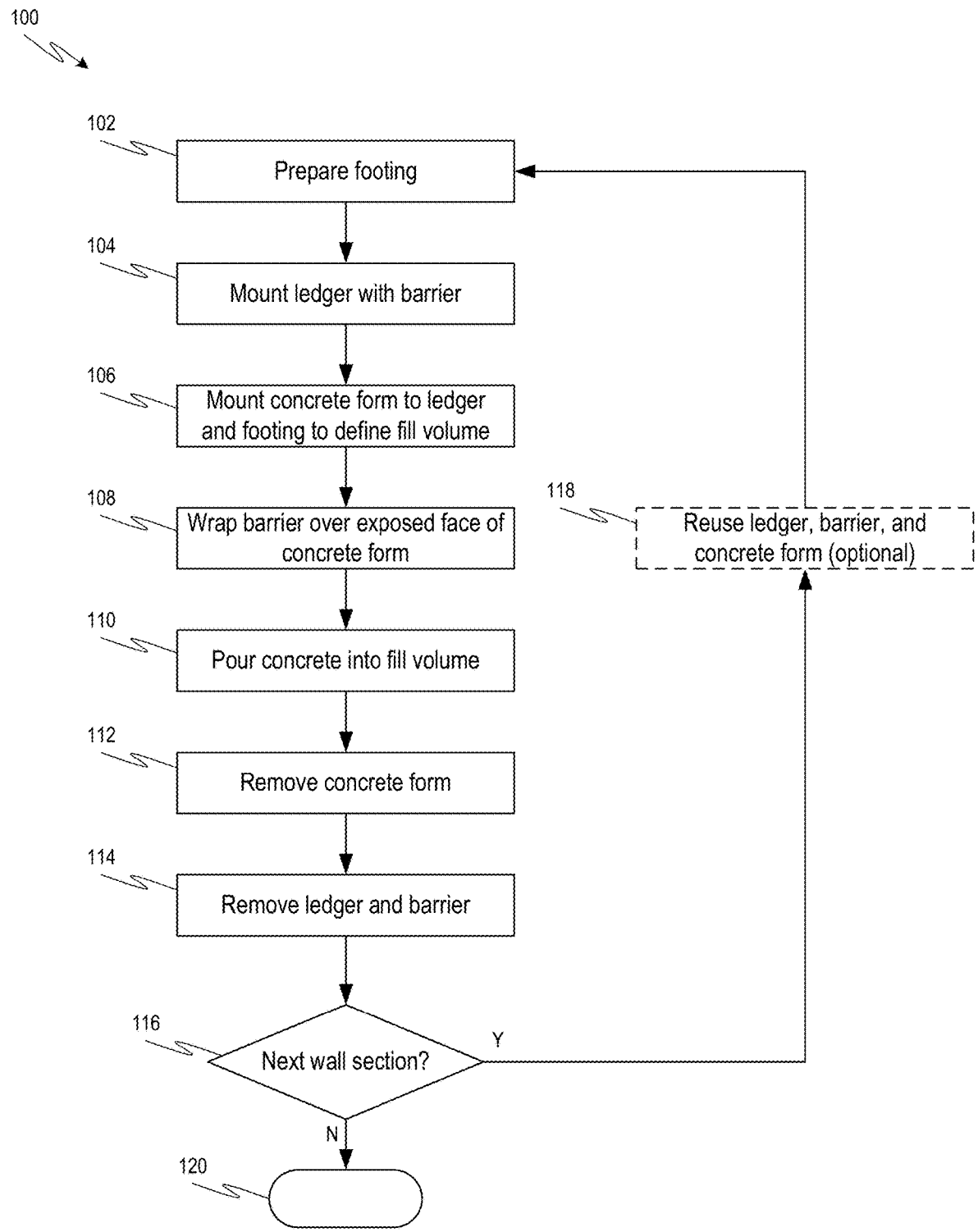
FIG. 1 is a simplified process flow diagram for an exemplary method of constructing a section of a seawall, according to one or more embodiments of the disclosed subject matter.
Figure 2A:
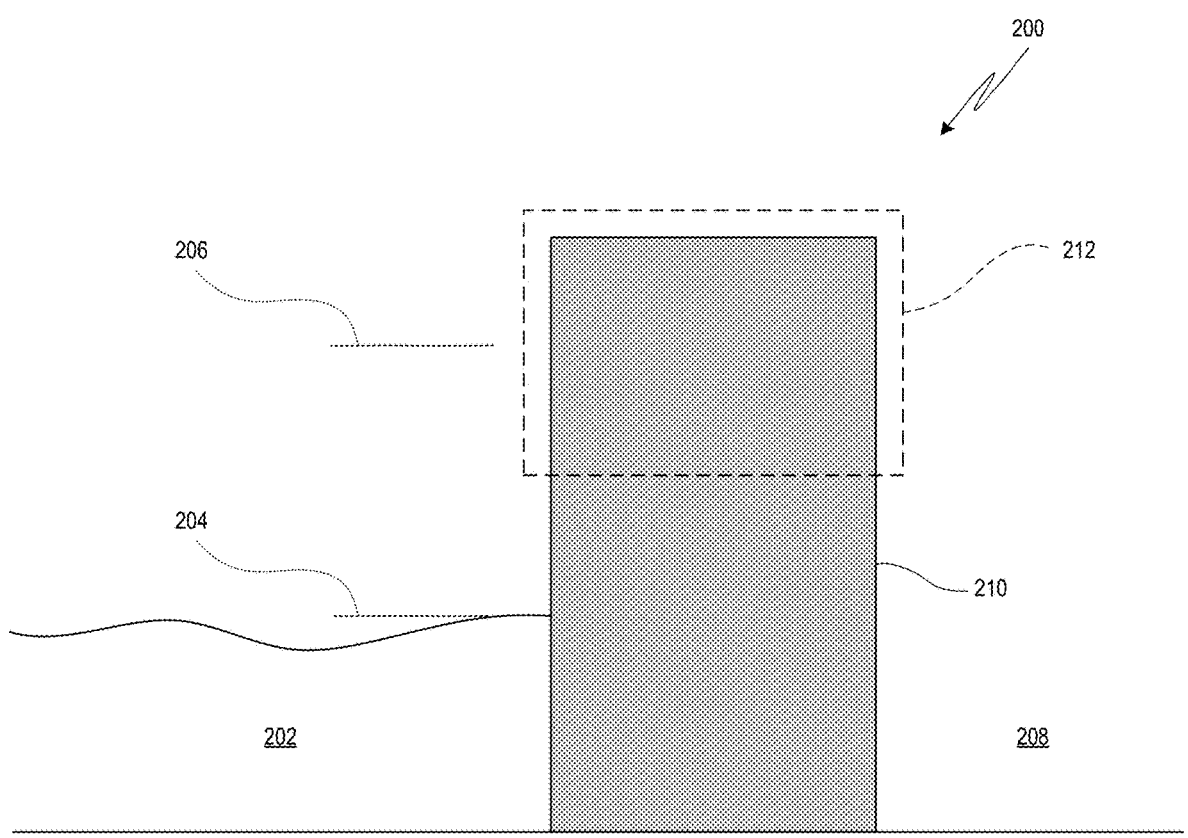
FIGS. 2A-2H are cross-sectional views of various stages in constructing a section of a seawall, according to one or more embodiments of the disclosed subject matter.
Figure 2B:
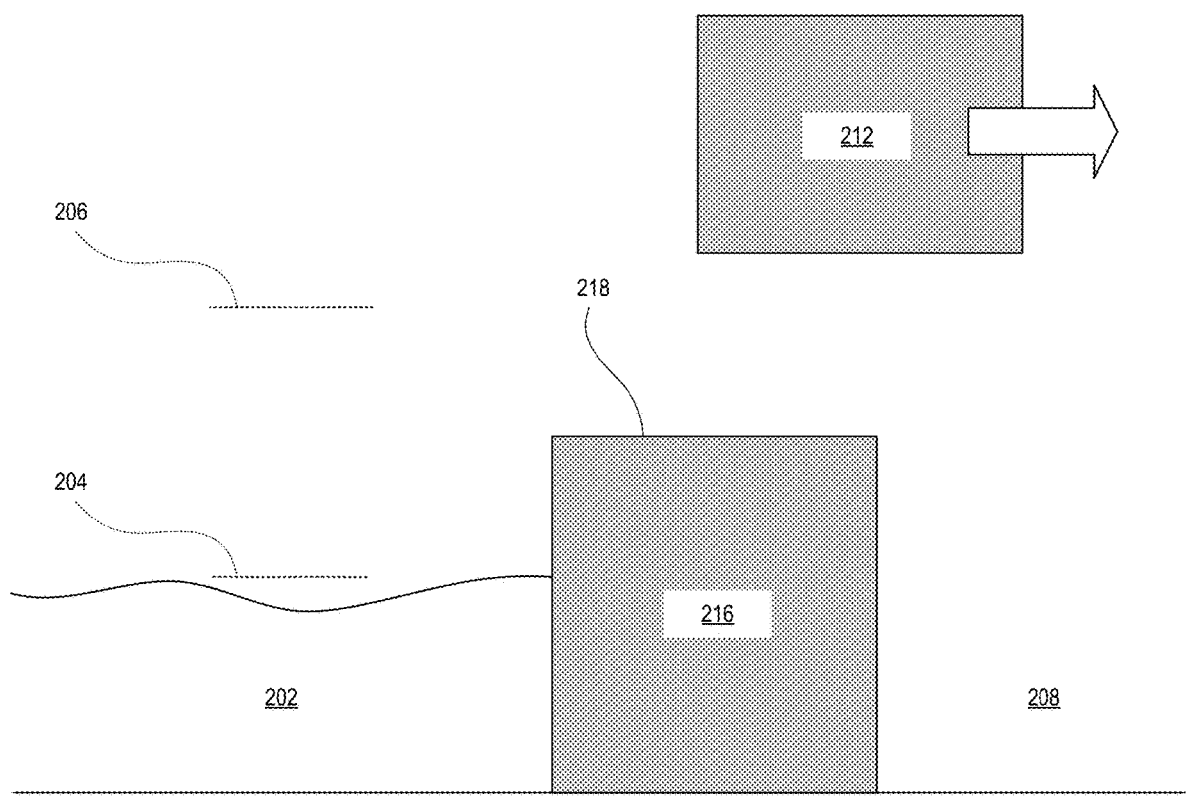

Referring to FIG. 1, an exemplary method 100 for constructing a section of a seawall is shown. The method 100 can initiate at process block 102, where a footing is prepared. In some embodiments, the footing can be prepared by cutting an existing seawall. For example, as shown in FIG. 2A, an existing seawall 200 is disposed adjacent to a body of water 202 to protect a landmass 208 behind the seawall 200. The body of water 202 is a tidal body, with water levels varying between a low-tide level 204 and a high-tide level 206. The footing can be prepared by removing an upper portion 212 of an existing concrete structure 210 that forms a section of the seawall 200. For example, as shown in FIG. 2B, the existing concrete structure 210 can be cut at a level between the high-tide level 206 and low-tide level 204. The cut upper portion 212 can then be removed, leaving behind a footing 216 with an exposed upper surface 218. In some embodiments, the preparation of the footing can occur during or around low tide of the body of water 202 (or at least away from the higher water levels associated with high tide), such that the height of the water does not extend over (or at least minimally extends over) the upper surface 218 of the footing 216.

Figure 6A:
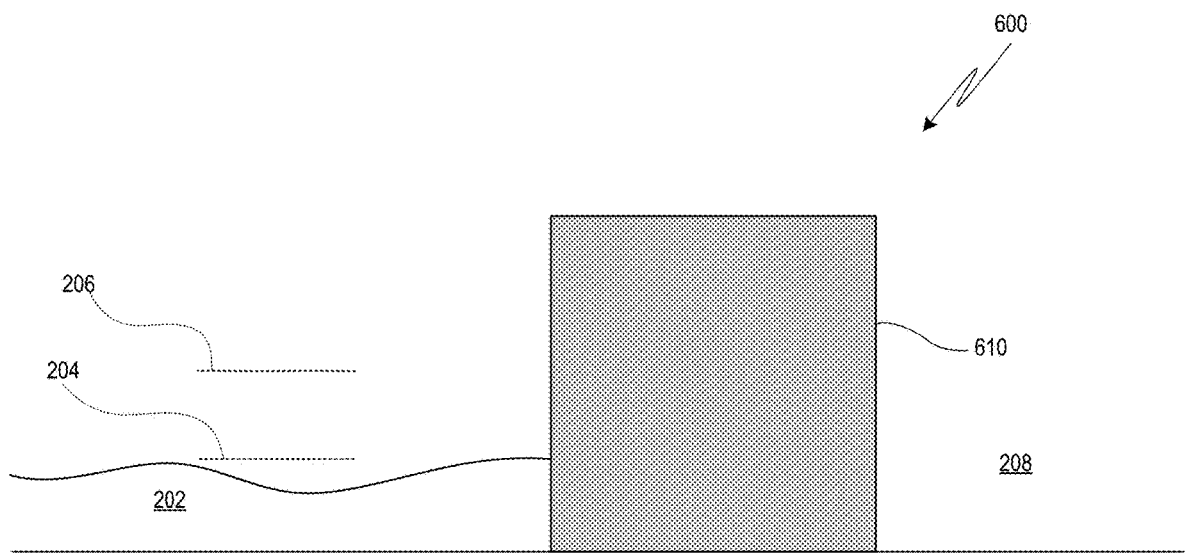
FIGS. 6A-6E are cross-sectional views of various stages in constructing a footing for a section of a seawall, according to one or more embodiments of the disclosed subject matter.
Figure 6B:
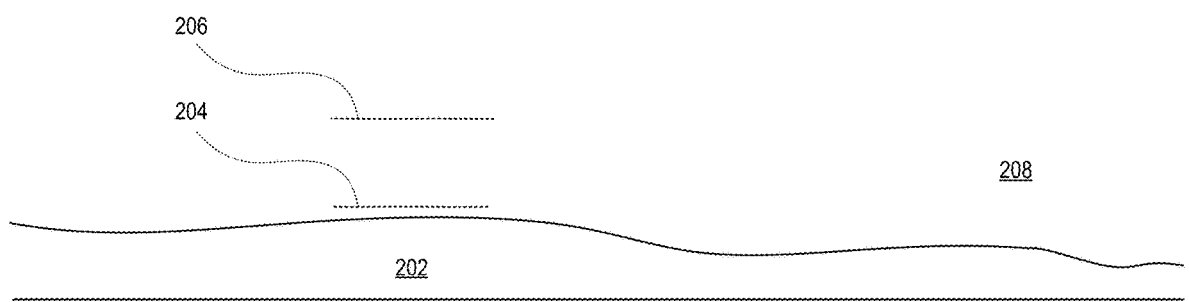
Figure 6C:
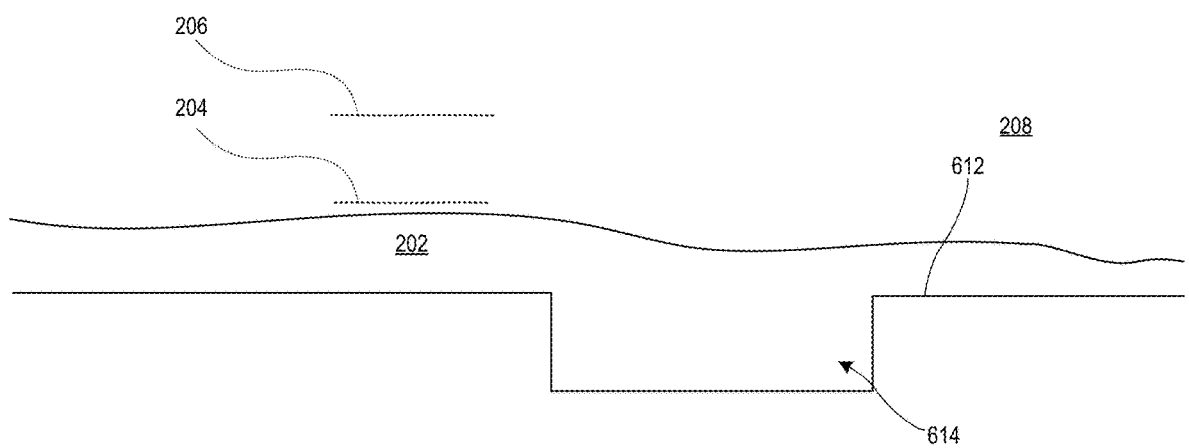
Figure 6D:
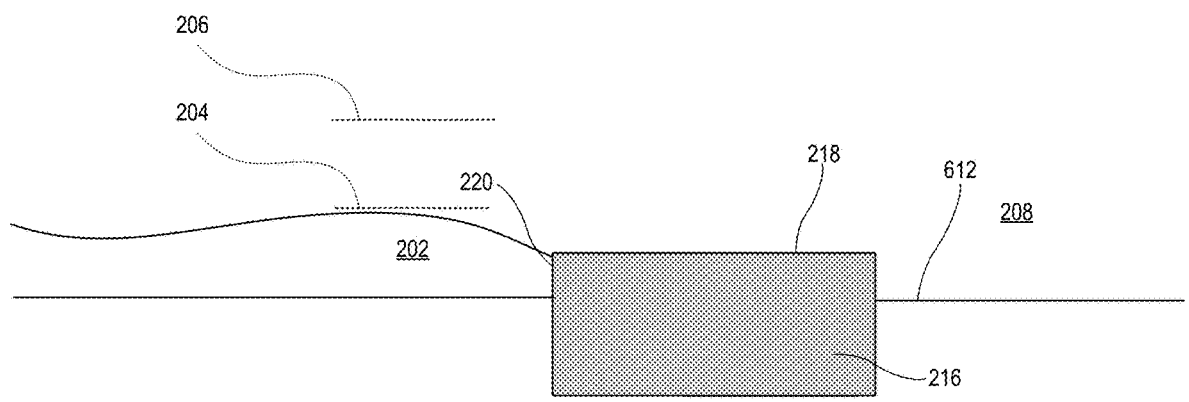

Alternatively, in some embodiments, process block 102 can include constructing a brand new footing after removal of an existing concrete structure. For example, as shown in FIG. 6A, an existing seawall 600 is disposed adjacent to a body of water 202. The footing can be prepared by completely removing the existing concrete structure 610 that forms a section of the seawall 600, as shown in FIG. 6B. As shown in FIG. 6C, a trench 614 can then be formed (e.g., by excavating) in the ground 612 upon which the concrete structure 610 was previously disposed. Concrete is then poured into the trench 614 and allowed to harden to form a footing 216 with exposed upper surface 218, as shown in FIG. 6D.

In some embodiments, the forming of trench 614 and/or the pouring of the concrete into trench 614 to form the footing 216 can occur during or around low tide of the body of water 202 (or at least away from the higher water levels associated with high tide), such that the height of the water does not extend over (or at least minimally extends over) the trench 614. In other embodiments, prior to pouring of the concrete, the water may extend into the trench 614 and potentially to the protected landmass 208, as shown in FIGS. 6B-6C. In such embodiments, the pouring of the concrete may be such that the water is displaced from the trench 614. Alternatively or additionally, a temporary cofferdam can be installed to keep water 202 away from the construction site during the forming of trench 614 and/or pouring of concrete into trench 614 to form footing 216. In some embodiments, additional structures can be placed within or adjacent to the trench 614 to define a shape of any poured concrete that extends above trench 614.

Returning to FIG. 1, the method 100 can proceed from process block 102 to process block 104, where a ledger and barrier member are mounted to the footing. In some embodiments, at least part of the barrier member can be disposed between facing surfaces of the ledger and the footing, and the ledger can be mounted to the footing through the barrier member. For example, the barrier member can be a substantially waterproof (or at least water-resistant) flexible sheet or cloth of sufficient strength to withstand exposure to the tidal body (e.g., tidal currents or waves) and the environment, and the ledger can be a substantially rectangular beam of sufficient strength to support the weight of a concrete form thereon. For example, the substantially waterproof sheet or cloth can be formed of a polymer, such as polyethylene, and the ledger can be formed of wood. In some embodiments, the barrier member is a polyethylene sheet having a thickness of at least 15 mil (0.015"), for example, between 15 mil and 60 mil (0.060"), inclusive, and/or the ledger is a wooden beam, for example, a 2×4 piece of lumber.

Figure 2C:
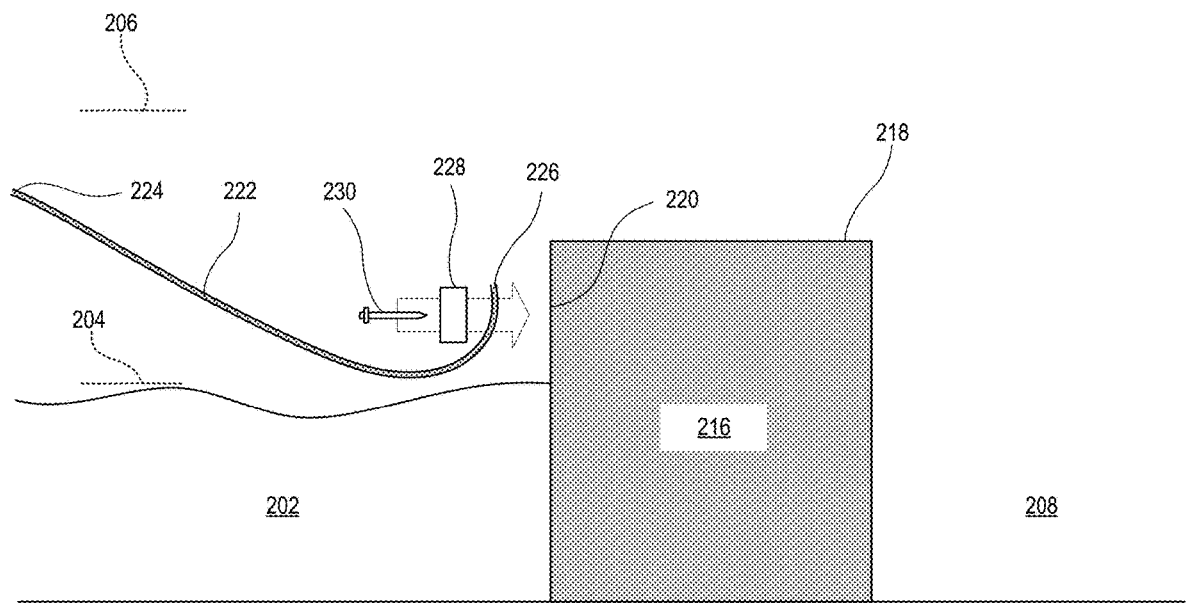

For example, as shown in FIG. 2C, a sheet-like barrier member 222 has a first end 224 (e.g., top end) and a second end 226 (e.g., bottom end). The ledger 228 is mounted to a front surface 220 of footing 216 by one or more coupling members 230 (e.g., a bolt or screw) that are inserted through the ledger 228 into the footing 216. At least the second end 226 of the barrier member 222 is disposed between the ledger 228 and the front surface 220 of footing 216, thereby securing the barrier member 222 to the footing 216. In some embodiments, the ledger 228 is mounted at a height on the front surface 220 of the footing 216 that is between an upper surface 218 of the footing and a low-tide level 204 for the tidal body of water 202, for example, above a current level of water 202. For example, the ledger 228 may be mounted such that a top surface of the ledger 228 is about 12 inches below upper surface 218 of the footing 216. In other embodiments, the ledger 228 may be mounted such that the top surface of the ledger 228 is substantially flush with the upper surface 218 of the footing 216.

Figure 2D:
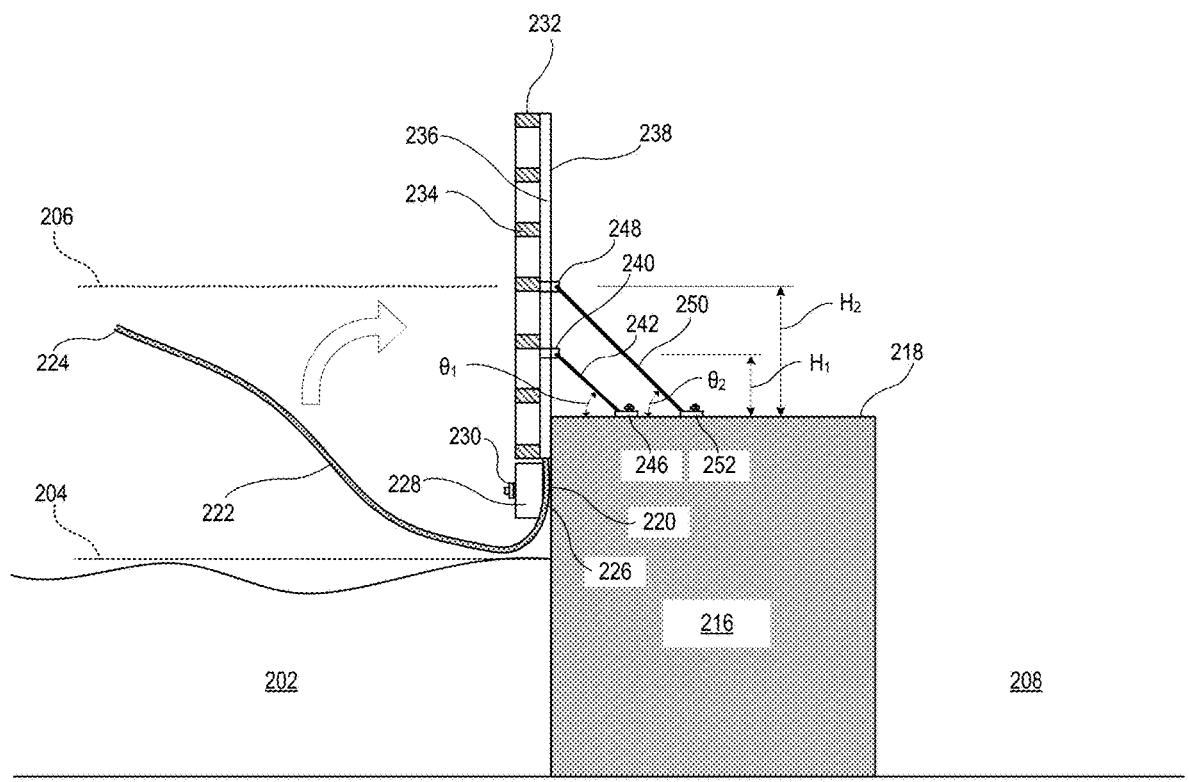
Figure 2E:
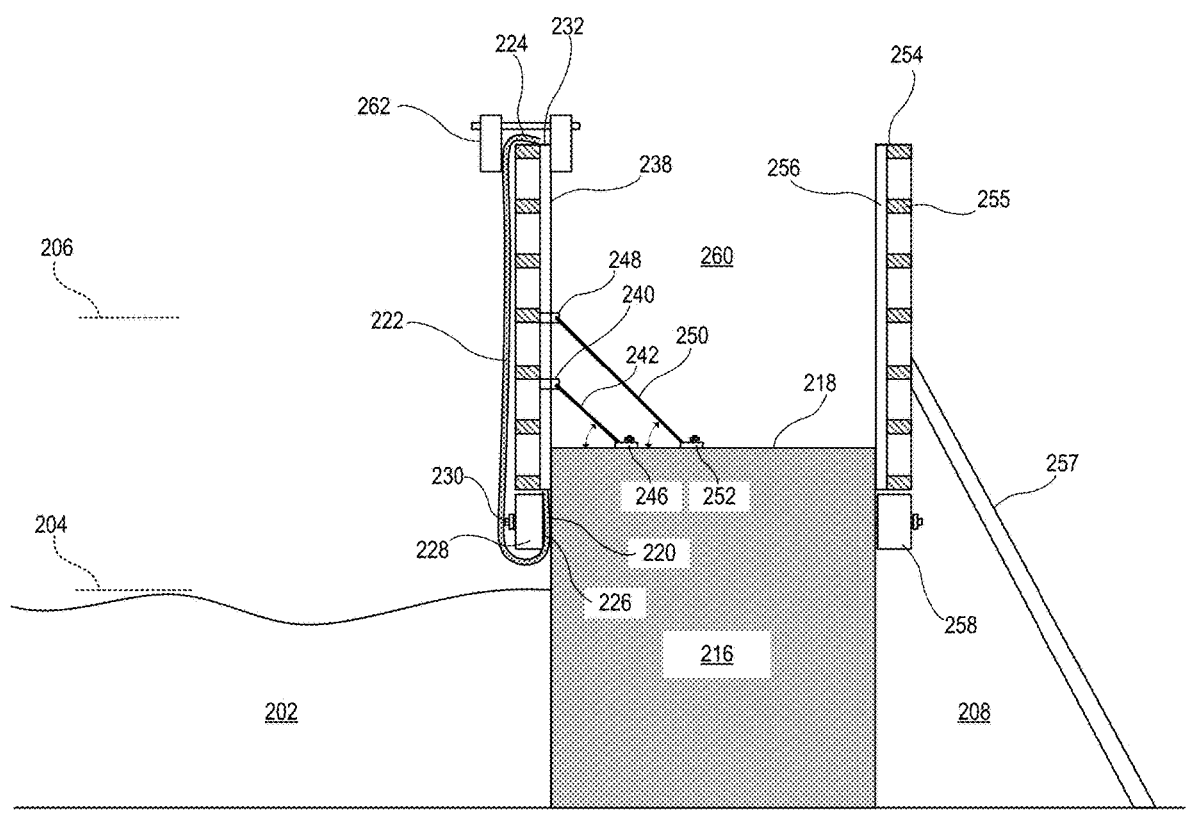
Figure 4:
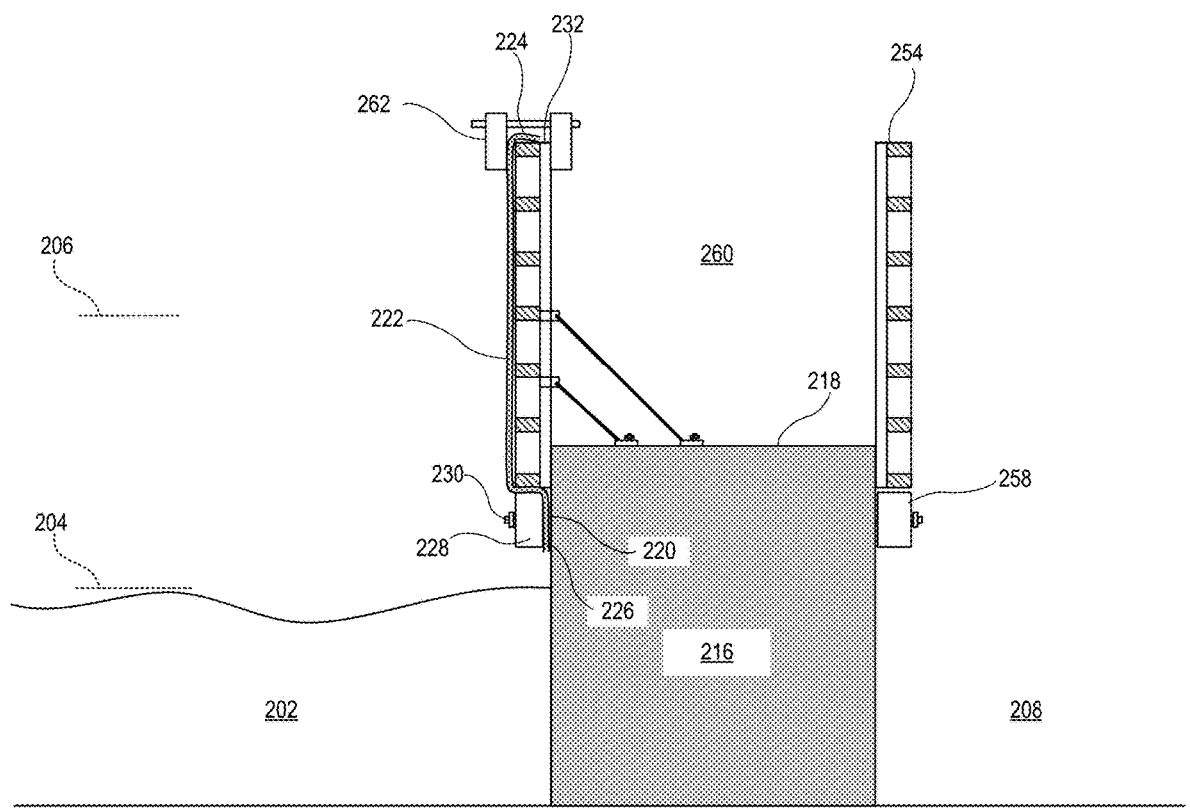
FIG. 4 is a cross-sectional view showing an alternative arrangement of a barrier member in constructing a section of a seawall, according to one or more embodiments of the disclosed subject matter.

In some embodiments, the second end 226 of the barrier member 222 is oriented upward with respect to the ledger 228, such a portion of the barrier member 222 between the first end 224 and the second end 226 wraps around a bottom surface and a front surface (e.g., facing the water 202) of ledger 228, as shown in FIGS. 2C-2E. In other embodiments, the second end 226 of the barrier member 222 is oriented downward with respect to the ledger 228, such that a portion of the barrier member 222 between the first end 224 and the second end 226 extends between a top surface of the ledger 228 and concrete form 232, as shown in FIG. 4

In some embodiments, the ledger 228 can have throughholes through which coupling member(s) 230 extend. Alternatively or additionally, the second end 226 of the barrier member 222 can also have through-holes that align with the through-holes of the ledger 228. In some embodiments, through-holes in the ledger 228 can include a countersink or counterbore. Thus, a head of the coupling member 230 can be retained below a surface of the ledger 228 once fully installed, for example, to avoid ripping or otherwise damaging the barrier member 222 when the barrier member 222 is disposed in position over the surface of the ledger 228 (see, for example, FIG. 2F). In other embodiments, the coupling member(s) 230 are installed without any preexisting through-holes in the ledger 228 and/or barrier member 222, for example, by screwing or drilling directly through the ledger 228 and/or barrier member 222.

Returning to FIG. 1, the method 100 can proceed from process block 104 to process block 106, where one or more concrete forms are mounted to the ledger and to the footing to define a fill volume. In some embodiments, a concrete form can be placed atop the ledger and can extend substantially perpendicular to the upper surface of the footing. In some embodiments, process block 106 further includes, once the concrete form is disposed in place on the ledger, attaching one or more support members to the concrete form, for example, between the concrete form and the footing. In some embodiments, each support member includes a coil rod with an attachment piece at one end for coupling to the concrete form and an anchor piece at an opposite end for coupling to the upper surface of the footing. In addition to securing the concrete form in place for the pouring of concrete, the support members can also brace the concrete form against forces that it would experience due to contact with the body of water, for example, when the water is at a high-tide level.

Figure 3A:
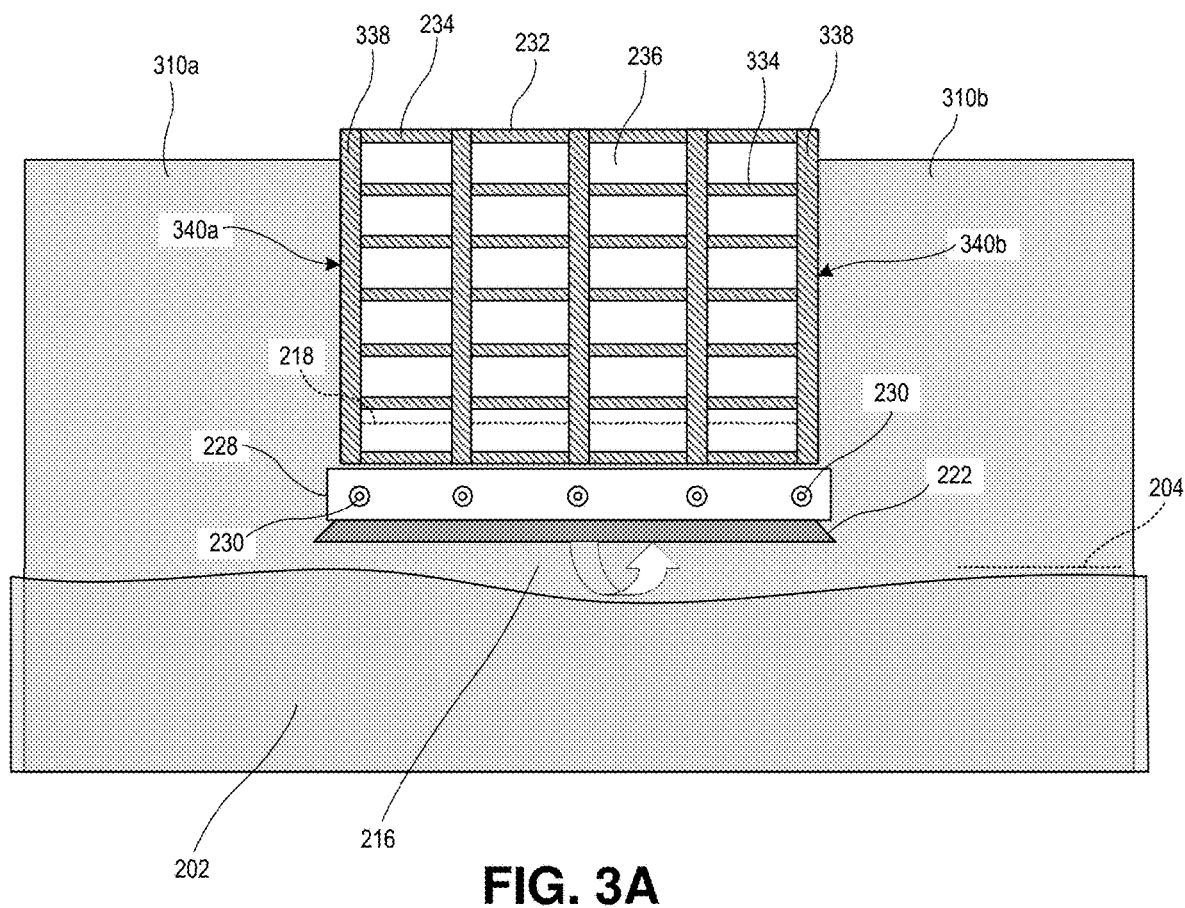
FIGS. 3A-3C are views from the body of water of various stages in constructing a section of a seawall, according to one or more embodiments of the disclosed subject matter.
Figure 6E:
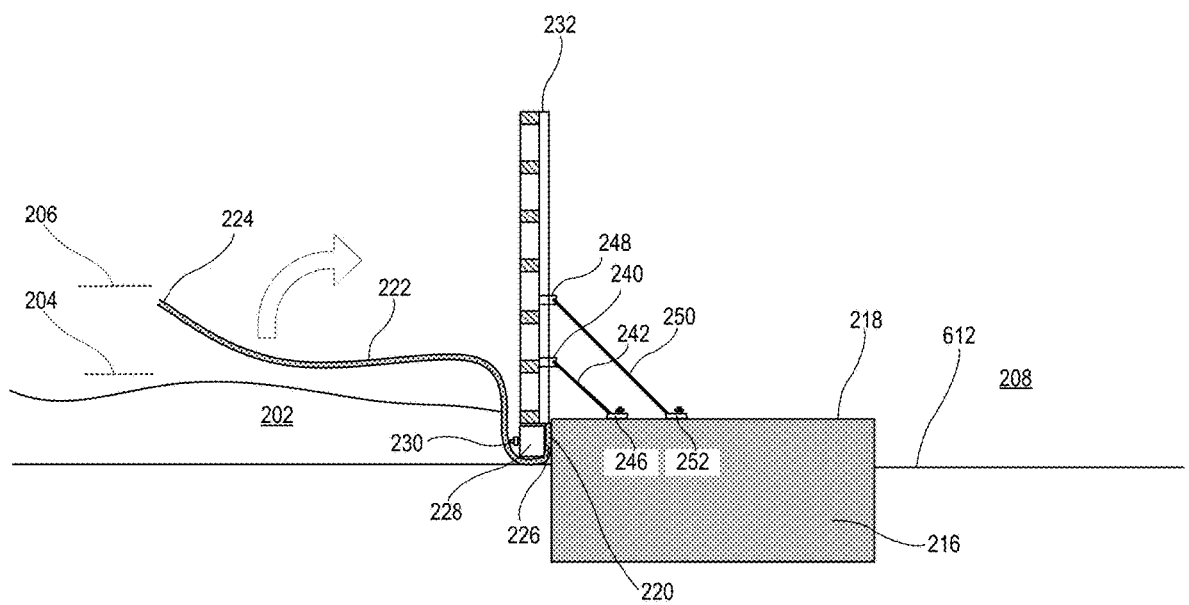

For example, as shown in FIGS. 2D, 3A, and 6E, a concrete form 232 is disposed on an upper surface of ledger 228 and adjacent to the front surface 220 of the footing 216. The concrete form 232 comprises a panel 236 (e.g., laminated plywood) supported by a metal frame 234 (e.g., vertical metal rails 338 connected together by horizontal metal cross-bars 334). For example, the concrete form 232 can be a Symons® Steel-Ply Forming System FI0424 24"×4' panel (Dayton Superior Corporation, Ohio). The mounting of the concrete form 232 further includes attaching a first end of a first rigid support member 242 to the concrete form 232 and an opposite second end to the upper surface 218 of the footing 216. For example, the first support member 242 can be metal coil rod (e.g., ½" steel coil rod) that attaches to the concrete form 232 at the first end via a tie 240 (e.g., Steel-Dog Aluma-Coil™ AC-4 tie, Titcomb Bros. Mfg., Massachusetts) and that attaches to footing 216 at the second end via an anchor 246 (e.g., Steel-Dog AnchorBar™ AB-4 bolt-down attachment bracket, Titcomb Bros. Mfg., Massachusetts). The first support member 242 is oriented at an angle, $\theta_1$, with respect to the upper surface 218 of the footing 216. Alternatively or additionally, $\theta_1$ may be measured with respect to surface 238 of the panel 236 of the concrete form 232. For example, the angle $\theta_1$ of the first support member 242 is about 45°.

In some embodiments, multiple rigid support members are provided at different heights on the concrete form 232, which can enable the concrete form 232 to better withstand impact of the body of water 202 at high tide (as well as other levels between high-tide level 206 and the upper surface 218 of the footing 216). For example, as shown in FIGS. 2D and 6E, a second support member 250 can be attached at a third end to the concrete form 232 and at an opposite fourth end to the upper surface 218 of the footing 216. For example, the second support member 250 can also be metal coil rod (e.g., ½" steel coil rod) that attaches to the concrete form 232 at the third end via a tie 248 (e.g., Steel-Dog Aluma-Coil™ AC-4 tie) and that attaches to footing 216 at the fourth end via an anchor 252 (e.g., Steel-Dog AnchorBar™ AB-4 bolt-down attachment bracket). The second support member 250 is oriented at an angle, $\theta_2$, with respect to the upper surface 218 of the footing 216. Alternatively or additionally, $\theta_2$ may be measured with respect to surface 238 of the panel 236 of the concrete form 232. In some embodiments, the angled orientation of the first and second support members can be substantially the same. For example, the angle $\theta_1$ of the first support member 242 and the angle $\theta_2$ of the second support member 250 can each be about 45°.

In some embodiments, the second support member 250 can attach to the concrete form 232 at a height, $H_2$, with respect to the upper surface 218 of the footing 216 that is greater than a height, $H_1$, with respect to the upper surface 218 at which the first support member 242 attaches to the concrete form. For example, as shown in FIG. 2D, the attachment height $H_2$ for the second support member 250 can substantially correspond to the high-tide level 206, and the attachment height $H_1$ for the first support member 242 can be between the high-tide level 206 and the upper surface 218 of the footing 216. In some embodiments, for example, the tie 248 for the first support member 242 can be substantially midway between the upper surface 218 of the footing 216 and tie 248 of the second support member 250 along a vertical direction (e.g., a direction parallel to surface 238 of the panel 236). Thus, in some embodiments, $H_1 \approx H_2/2$.

As shown in FIGS. 2D-2E, the panel 236 of concrete form 232 has a surface 238, which is designed to define a substantially-vertical sidewall of the fill volume 260 and to contact concrete poured into the fill volume 260 (also referred to as a pour volume). A bottom wall of the fill volume 260 is defined by the upper surface 218 of the footing. Other sidewalls of the fill volume 260 can be defined by other concrete forms, for example, a concrete form 254 mounted at a land-side surface of the footing 216, as shown in FIG. 2E. In some embodiments, concrete form 254 can have a construction (e.g., panel 256 supported by a metal frame 255) and can be mounted similar to concrete form 232. For example, concrete form 254 can be mounted to footing 216 using a ledger 258 and can have one or more support members extending between panel 256 and the upper surface 218 of the footing 216. However, since concrete form 254 is not exposed to the body of water 202, barrier members and/or support members for concrete form 254 can be optional. In some embodiments, conventional bracing configurations can be used for concrete form 254, for example, by using angled support members 257 (e.g., wood beams) that extend from landmass 208 to the frame 255 of the concrete form 254. Depending on the surrounding terrain or structures, provision of ledger 258 for mounting concrete form 254 may also be optional, for example, by placing concrete form 254 directly on the ground adjacent to footing 216.

In some embodiments, other sidewalls of the fill volume 260 can be defined by adjacent concrete structures, for example, portions of a prior seawall that have not yet been removed or portions of a new seawall that have already been constructed. For example, as shown in FIG. 3A, the concrete form 232 can be disposed between existing portions 310a, 310b of the seawall that thus form respective left and right sidewalls of the fill volume 260. In some embodiments, one or more of the existing portions 310a, 310b are removed (e.g., by cutting and removal, similar to that shown for upper portion 212 in FIGS. 2A-2B) and replaced with a concrete form to form a sidewall of the fill volume 260. In such embodiments, the concrete form may be mounted atop the cut surface of the existing seawall (e.g., upper surface 218 in FIG. 2B) and can extend in a direction away from the body of water 202 and/or toward the protected landmass 208.

Figure 5:
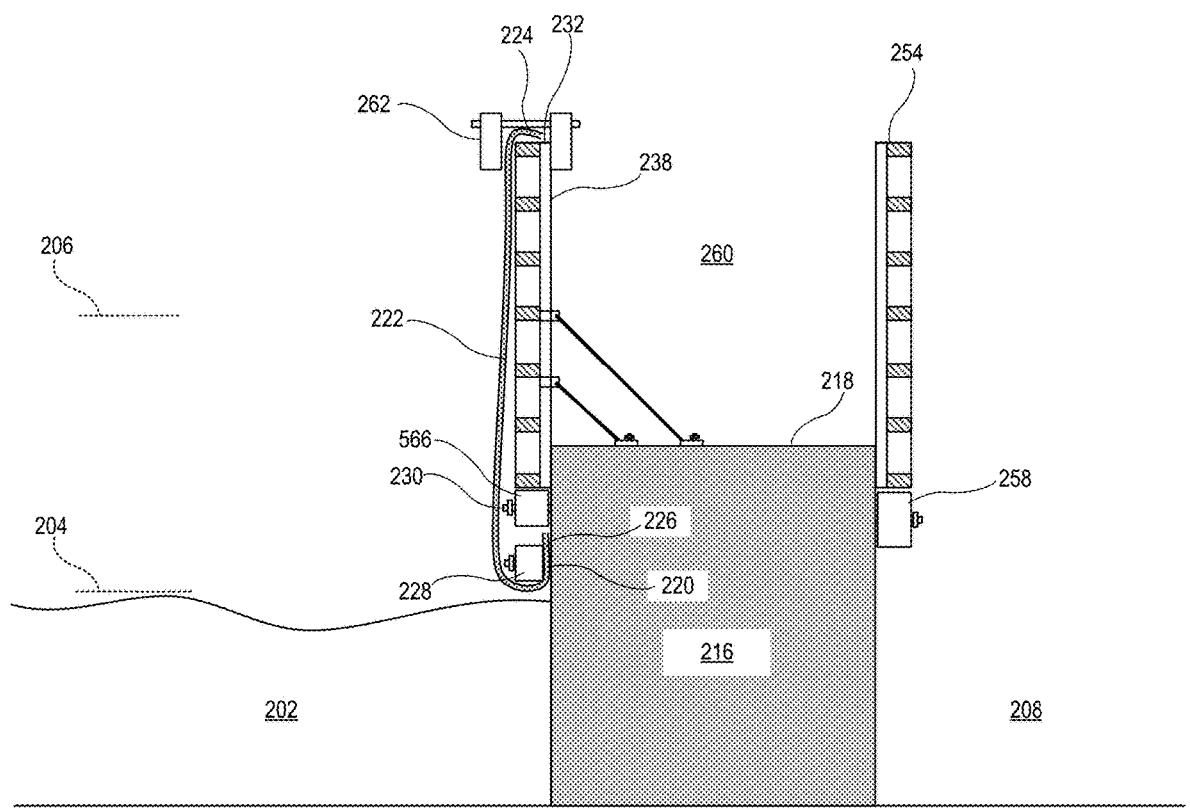
FIG. 5 is a cross-sectional view showing an alternative configuration using separate ledgers in constructing a section of a seawall, according to one or more embodiments of the disclosed subject matter.

In some embodiments, process block 106 can further include mounting a separate ledger for the concrete form. For example, as shown in FIG. 5, a first ledger 228 is mounted to the front surface 220 of the footing 216 with the second end 226 of the barrier member 222 retained therebetween, and a separate second ledger 566 is mounted over the first ledger 228 to support the concrete form 232 thereon. The second ledger 566 is mounted to a front surface 220 of footing 216 by one or more coupling members 230 (e.g., a bolt or screw) that are inserted through the second ledger 566 into the footing 216. In some embodiments, the second ledger 566 is mounted at a height on the front surface 220 of the footing 216 that is between an upper surface 218 of the footing and a low-tide level 204 for the tidal body of water 202, for example, above a current level of water 202. For example, the second ledger 566 may be mounted such that a top surface of the ledger 556 is about 12 inches below upper surface 218 of the footing 216, and the first ledger 228 for the barrier member 222 is mounted below the second ledger 566, for example, above the current level of water 202. In other embodiments, the second ledger 566 may be mounted such that the top surface thereof is substantially flush with the upper surface 218 of the footing 216. In some embodiments, since the second ledger 566 is required to support the weight and size of the concrete form 232 and the first ledger 228 is only required to retain the barrier member 222 to the footing 216, the cross-sectional size of the first ledger 228 may be less than that of the second ledger 566.

Returning to FIG. 1, the method 100 can proceed from process block 106 to process block 108, where the barrier member is positioned over the concrete form to protect the concrete form from the body of water. For example, the barrier member can be extended from the ledger where it is attached to cover the portion of the concrete form that faces the body of water. Process block 108 can also include coupling at least part of the barrier member to the concrete form to retain the barrier member in place. In some embodiments, process block 108 can further include coupling the barrier member to adjacent structures, such as adjacent concrete forms or seawall portions that form other sidewalls of the fill volume. As noted above, the barrier member is a substantially waterproof (or at least water-resistant) sheet or cloth, and thus the positioning of the barrier member over the concrete form can prevent water from accessing the fill volume through the concrete form, for example, when the body of water would otherwise come into contact with the concrete form (e.g., during high tide or when the water level would otherwise be above the ledger).

Figure 3B:
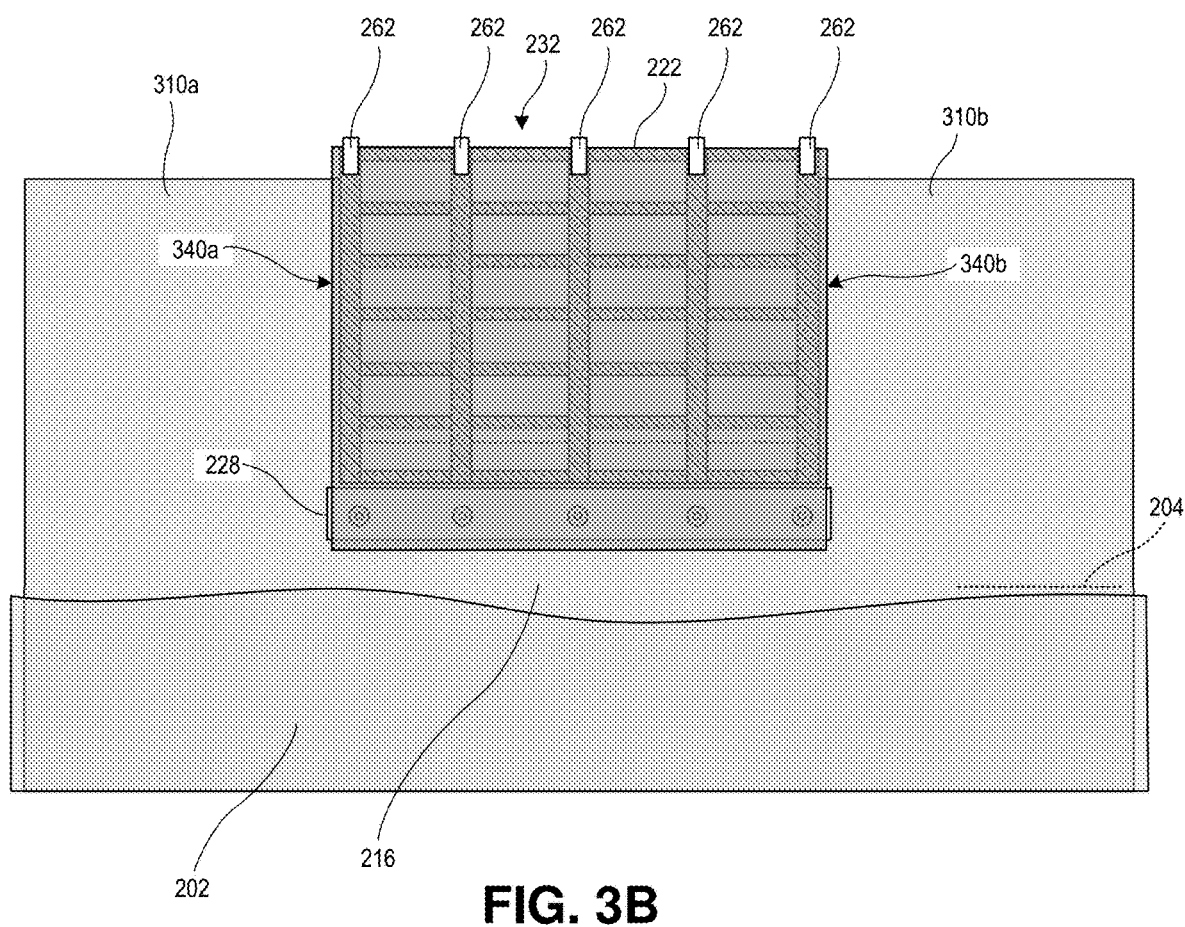

For example, FIGS. 2E and 3B illustrate positioning of the barrier member 222 over concrete form 232. The barrier member 222 is wrapped around a bottom surface and extends vertically upward to cover the front surface of the ledger 228 and the surface of the concrete form 232 facing the body of water 202. The first end 224 of the barrier member 222 is positioned at or adjacent to a top end of the concrete form 232, and one or more fasteners 262 are used to couple the first end 224 to the top end of the concrete form 232. For example, each fastener 262 can be a clamping device that fits over a top end of the concrete form 232, such as, a C-clamp, bar clamp, spring clamp, etc. In some embodiments, the barrier member 222 can be coupled to the concrete form 232 using other temporary or reusable coupling mechanisms, such as, but not limited to, hook-and-loop fasteners, double-sided tape, magnetic attachments, protrusions (e.g., hooks, prongs, or the like) on the concrete form 232 that fit into respective openings (e.g., eyelets) in the barrier member, etc. In some embodiments, the first end 224 of the barrier member 222 is disposed on the top of the concrete form 232 once the barrier member 222 is pulled taut. In other embodiments, the first end 224 can extend over the top end of the concrete form 232 into the fill volume 260 once the barrier member 222 is pulled taut, such that fastener 262 contacts the barrier member 222 on opposite sides of the concrete form 232.

In some embodiments, lateral ends (e.g., left edge 340a and right edge 340b in FIG. 3B) of the barrier member 222 can be coupled to surrounding structures to prevent ingress of water therethrough into the fill volume 260. Alternatively or additionally, the lateral ends of the barrier member can be extended toward the protected landmass 208 and away from contact with the water. In some embodiments, for example, a second ledger can be mounted to the adjacent structure (e.g., left seawall portion 310a, right seawall portion 310b, or another concrete form) in a substantially vertical orientation and the lateral end retained between the second ledger and the adjacent structure. Alternatively or additionally, the barrier member can be secured to an adjacent structure or another barrier member (e.g., covering an adjacent concrete form) using tape, such as a sealing lap tape.

Figure 2F:
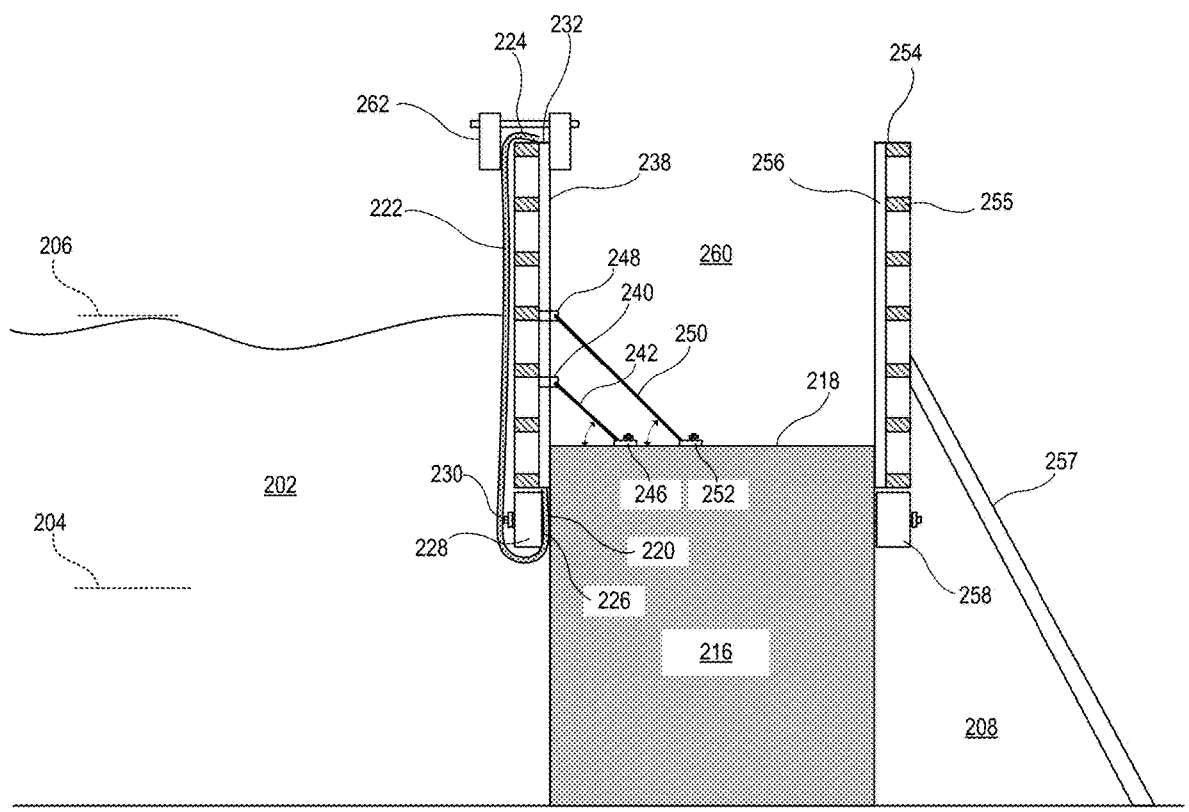
Figure 2G:
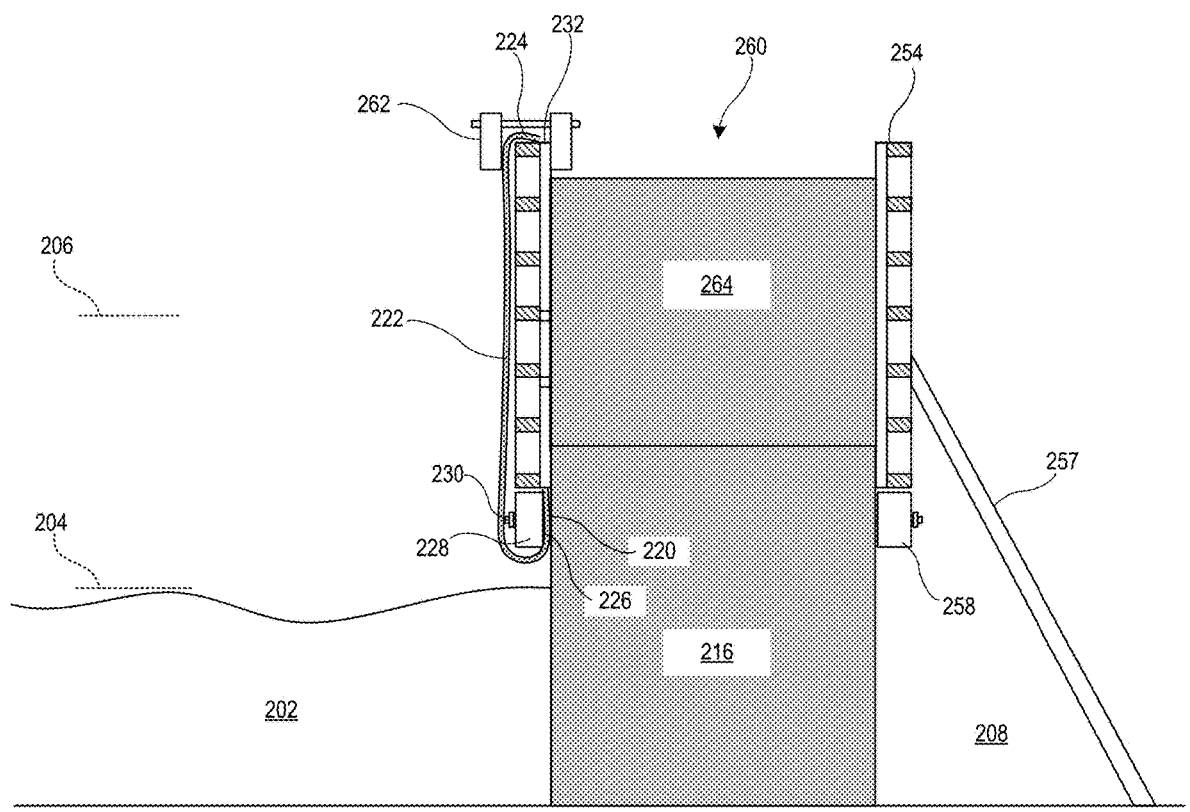
Figure 2H:
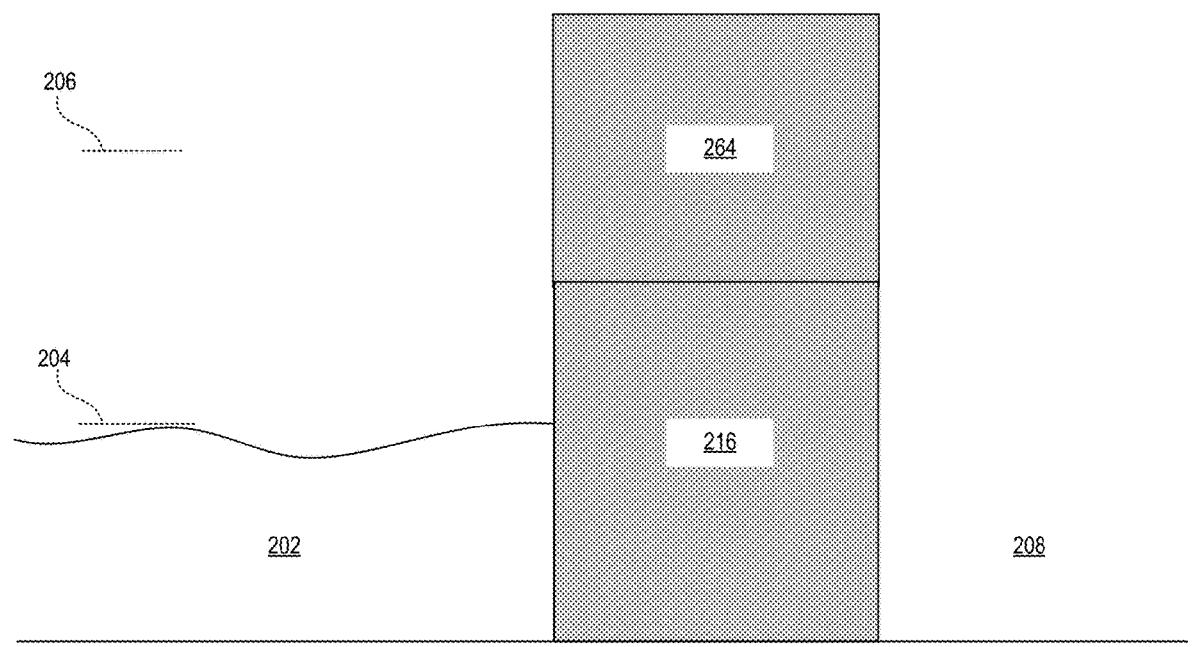

Returning to FIG. 1, the method 100 can proceed from process block 108 to process block 110, where liquid concrete is poured into fill volume. The poured concrete is then allowed to harden to form the new seawall section 264 atop the footing 216, for example, as shown in FIG. 2G. Once the concrete has sufficiently hardened, the method 100 can proceed to process block 112, where the concrete forms are removed to expose the newly formed seawall section 264, for example, as shown in FIG. 2H. Process block 112 can include decoupling the barrier member from the concrete form and decoupling the concrete form from the footing. For example, fastener 262 can be removed from the concrete form 232, thereby releasing the first end 224 of the barrier member 222. The concrete form 232 can then be decoupled from the footing 216, for example, by severing the connections between ties 240, 248 and the concrete form 232. Since support members 242, 250, and anchors 246, 252 were disposed within the fill volume 260 during the pouring of concrete, they remain encased within the concrete and are left behind within the seawall section 264 after the concrete form 232 is decoupled.

The method 100 can proceed to process block 114, where the ledger and barrier member are also removed. For example, after the concrete form 232 is removed, the ledger 228 can then be dismounted, for example, by removing coupling member(s) 230, thereby releasing the second end 226 of the barrier member 222. In some embodiments, process block 114 can further include performing one or more finishing procedures. For example, seawall section 264 can be finished by filling the holes formed in the seawall section 264 by removal of ties 240, 248 or any other defects (e.g., honeycombing), for example, by using a mortar or a quick-setting, cementitious patching product (e.g., Patch & Rub, Kaufman Products, Maryland). Alternatively or additionally, footing 216 can be finished by also filling the holes formed in the footing 216 by coupling members 230 for ledger 228 or any other defects (e.g., honeycombing), for example, by using the mortar or the quick-setting, cementitious patching product. Other finishing procedures, such as painting, are also possible according to one or more contemplated embodiments.

Figure 3C:
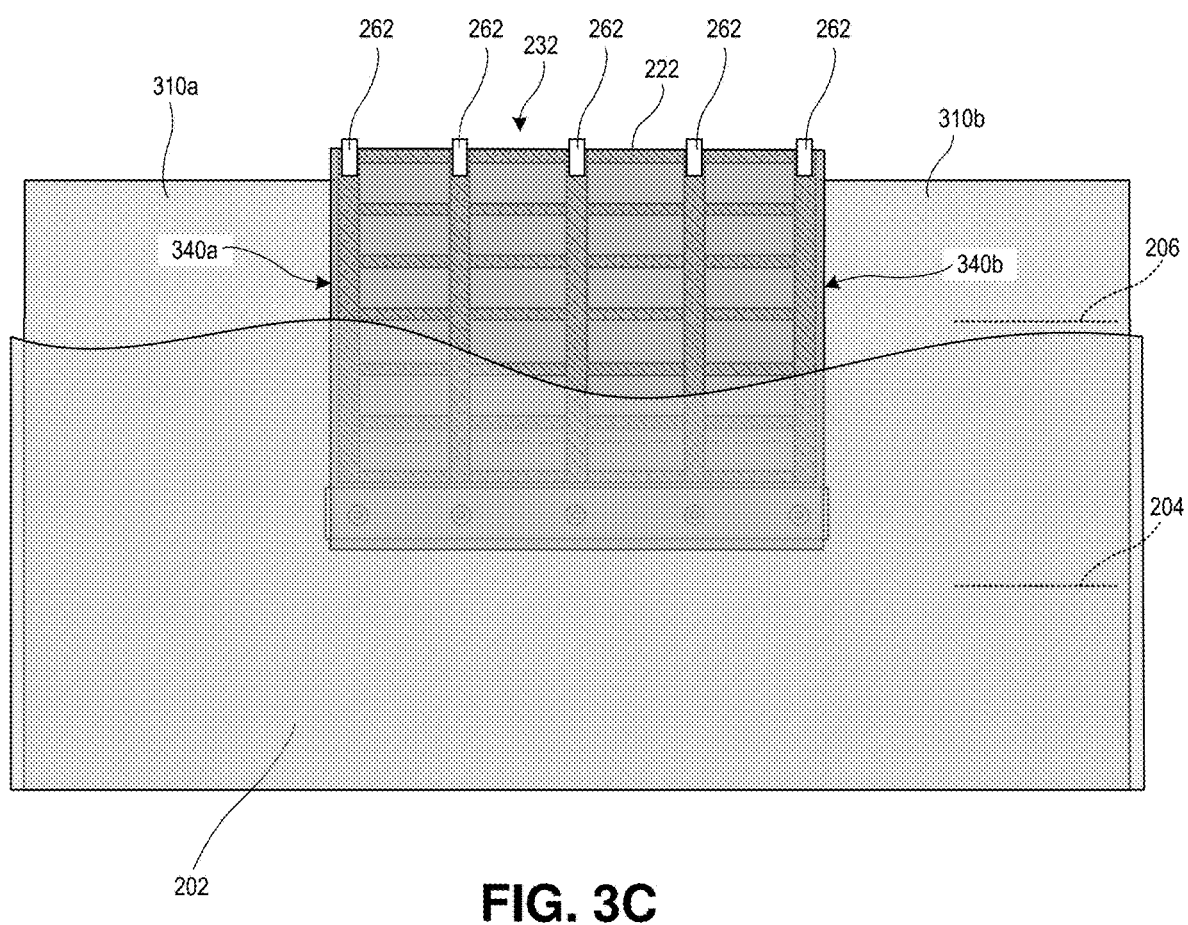

The concrete pouring of process block 110 can occur any time after the concrete form is mounted in process block 106 and the barrier member is positioned in process block 108. For example, the pouring of concrete in process block 110 may occur as a little as a few minutes or as much as several days (e.g., 7 days) after positioning of the barrier member in process block 108. The mounted concrete form may thus be subject to at least one high tide, and perhaps several high tides, where the body of water is at a level that would contact the concrete form. For example, as shown in FIGS. 2F and 3C, during high tide, the body of water 202 is at a level that would otherwise contact the concrete form 232 and potentially infiltrate the fill volume 260 therethrough. However, the barrier member 222 seals the concrete form 232 from the body of water 202, thereby maintaining a substantially dry fill volume 260. Concrete can thus be poured into the fill volume 260 without building a cofferdam and/or requiring water to be pumped from the fill volume 260. The rigid support members 242, 250 buttress the concrete form 232 against forces acting thereon from the body of water 202 through the barrier member 222, thereby maintaining the structural integrity of the construction site. Concrete can thus be poured into the fill volume 260 on a more flexible time schedule and without regard to current tidal conditions (e.g., concrete pouring in process block 110 can occur at any water level). For example, in some embodiments, at least process blocks 102-108 and 112-114 can be performed with a level of the body of water 202 below the upper surface 218 of the footing 216, and the level of the body of water 202 may be higher than the upper surface 218 of the footing 216 at a time between performance of process blocks 108 and 110. In some embodiments, during the time between performance of process blocks 108 and 110 (which may be on the order of hours or days), the concrete form 232 protected by the barrier member 222 may be subject to a least one high tide.

Returning to FIG. 1, the method 100 can proceed from process block 114 to decision block 116, where is determined if another section of the seawall is to be constructed. If construction of another section is desired, the method 100 can optionally proceed to process block 118, where the components from the previous seawall section construction are reused. For example, the concrete forms 232, 254, ledgers 228, 258, 566, coupling members 230, barrier member 222, and/or fasteners 262 can reused to form the next seawall section. However, since the support members 242, 250 and associated coupling components are consumed during the concrete pouring, additional support members 242, 250 may be required. Alternatively, all new components for constructing a seawall section can be provided. The method 100 can then return to the beginning where blocks 102-116 are repeated as needed. Otherwise, if construction of another seawall section is not desired at decision block 116, the method 100 can proceed to termination at block 120.

General Considerations

Although specific materials and dimensions have been discussed above and illustrated in the figures, such materials and dimensions are to be understood as exemplary only. Indeed, other materials and dimensions are also possible according to one or more contemplated embodiments. Moreover, although some components have been illustrated in the figures and described above as separate components, embodiments of the disclosed subject matter are not limited thereto. Rather, in some embodiments, certain components can be combined together into a single monolithic component (e.g., formed as an integral component without being assembled from various subcomponents). Furthermore, embodiments of the disclosed subject matter can include additional components beyond those specifically illustrated in the figures and described above.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, structures, and systems are not limited to any specific aspect or feature or combination thereof, nor do the disclosed embodiments require that any one or more specific advantages be present, or problems be solved. The technologies from any example can be combined with the technologies described in any one or more of the other examples. In view of the many possible embodiments to which the principles of the disclosed technology may be applied, it should be recognized that the illustrated embodiments are only illustrative examples and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

Unless explained otherwise, all technical and scientific terms used herein have the same meaning as commonly understood to one of ordinary skill in the art to which this disclosure belongs. As used in this application and in the claims, the singular forms "a," "an," and "the" include the plural forms unless the context clearly dictates otherwise. Additionally, the terms "have" or "includes" means "comprises." The term "or" refers to a single element of stated alternative elements or a combination of two or more elements, unless the context clearly indicates otherwise. As used herein, "and/or" means "and" or "or," as well as "and" and "or."

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

Directions and other relative references may be used to facilitate discussion of the drawings and principles herein, but are not intended to be limiting. For example, certain terms may be used such as "inside," "outside," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as our invention all that comes within the scope and spirit of these claims.

The invention claimed is:

1. A method comprising:
coupling a first end of a barrier member to a footing disposed in or adjacent a body of water, the barrier member being substantially waterproof;
mounting a concrete form to the footing such that a top end of the concrete form is disposed higher than an exposed upper surface of the footing, the mounted concrete form defining at least part of a fill volume over the upper surface of the footing;
coupling a second end of the barrier member to the concrete form such that the barrier member extends over a side of the concrete form opposite to the fill volume; and
subsequent to the coupling the second end of the barrier member to the concrete form, pouring concrete into the fill volume,
wherein the coupling the first end of the barrier member to the footing comprises coupling a ledger to a side surface of the footing that faces the body of water, the first end of the barrier member being retained between a first surface of the ledger and the side surface of the footing, the ledger having a second surface opposite the first surface, the second surface facing toward the body of water, and
wherein the mounting the concrete form to the footing comprises mounting such that the ledger at least partially supports the concrete form atop the ledger.

2. The method of claim 1, wherein the barrier member is a flexible polymer sheet or cloth.

3. The method of claim 1, wherein the ledger is a first leger, wherein the concrete form is a first concrete form, wherein the side surface of the concrete form is a first side surface, and wherein the method further comprises, prior to the pouring the concrete into the fill volume:
coupling a second ledger to a second side surface of the concrete form; and
mounting a second concrete form to the footing such that the second ledger at least partially supports the second concrete form atop the second ledger,
wherein the second concrete form defines part of the fill volume.

4. The method of claim 1, wherein the mounting the concrete form to the footing further comprises:
attaching one end of a support member to the upper surface of the footing and an opposite end of the support member to the concrete form.

5. The method of claim 4, wherein a height of the attachment of the support member to the concrete form substantially corresponds to a height at which the body of water contacts the barrier member at high tide.

6. The method of claim 1, further comprising:
prior to the coupling the first end of the barrier member to the footing, preparing the footing by removing an upper portion of an existing seawall while leaving in place a lower portion of the existing seawall, the lower portion forming the footing.

7. The method of claim 6, wherein the removing the upper portion of the existing seawall comprises cutting the existing seawall at a level between a height at which the body of water contacts the existing seawall at high tide and a height at which the body of water contacts the existing seawall at low tide.

8. The method of claim 1, further comprising:
prior to the coupling the first end of the barrier member to the footing, preparing the footing by pouring concrete into an open trench.

9. The method of claim 8, further comprising:
prior to the pouring the concrete into the open trench, forming the open trench in ground adjacent to or underneath the body of water.

10. The method of claim 9, further comprising:
prior to the forming the open trench, removing a portion of an existing seawall disposed upon the ground in which the open trench is formed.

11. The method of claim 1, further comprising, subsequent to the pouring the concrete into the fill volume:
decoupling the barrier member from the concrete form and the footing after the poured concrete cures to form a section of a seawall;
dismounting the concrete form from the footing; and
reusing the concrete form, the barrier member, or both to form another section of the seawall.

12. An assembly comprising:
a concrete form configured to be mounted to a footing disposed in or adjacent a body of water, the concrete form comprising a panel attached to a frame;

a barrier member having a first end configured to be coupled to the footing and a second end configured to be coupled to the concrete form; and a ledger configured to be coupled to a side surface of the footing that faces the body of water, wherein the concrete form is configured such that, when the concrete form is mounted to the footing, a top end of the concrete form is higher than an exposed upper surface of the footing and the panel defines at least part of a fill volume that extends over the upper surface of the footing, wherein the barrier member is configured such that, when the barrier member is coupled to the footing and the concrete form, the barrier member extends over a side of the concrete form opposite to the fill volume, wherein the barrier member is substantially waterproof, wherein the ledger is configured such that, when the ledger is coupled to the side surface of the footing, the first end of the barrier member is retained between a first surface of the ledger and the side surface of the footing and a second surface of the ledger opposite the first surface faces toward the body of water, and wherein the assembly is configured such that, when the ledger and the barrier member are coupled to the footing:
  the barrier member wraps around a bottom surface of the ledger and extends over the second surface of the ledger and the side of the concrete form; or
  the barrier member wraps around a top surface of the ledger and extends over the side of the concrete form such that the second surface of the ledger is not covered by the barrier member.

13. The assembly of claim 12, wherein the barrier member is a flexible polymer sheet or cloth.

14. The assembly of claim 12, further comprising:
a support member having one end configured to be attached to the upper surface of the footing and an opposite end configured to be attached to the concrete form.

15. A method comprising:

coupling a first end of a barrier member to a footing disposed in or adjacent a body of water, the barrier member being substantially waterproof;

mounting a concrete form to the footing such that a top end of the concrete form is disposed higher than an exposed upper surface of the footing, the mounted concrete form defining at least part of a fill volume over the upper surface of the footing;

coupling a second end of the barrier member to the concrete form such that the barrier member extends over a side of the concrete form opposite to the fill volume; and subsequent to the coupling the second end of the barrier member to the concrete form, pouring concrete into the fill volume, wherein the coupling the first end of the barrier member to the footing comprises coupling a first ledger to a side surface of the footing that faces the body of water, the first end of the barrier member being retained between a first surface of the first ledger and the side surface of the footing, the first ledger having a second surface opposite the first surface, the second surface facing toward the body of water, and wherein the mounting the concrete form to the footing comprises coupling a second ledger to the side surface of the footing over the first ledger such that the second ledger at least partially supports the concrete form atop the second ledger.

* * * * *